UNITED STATES PATENT OFFICE.

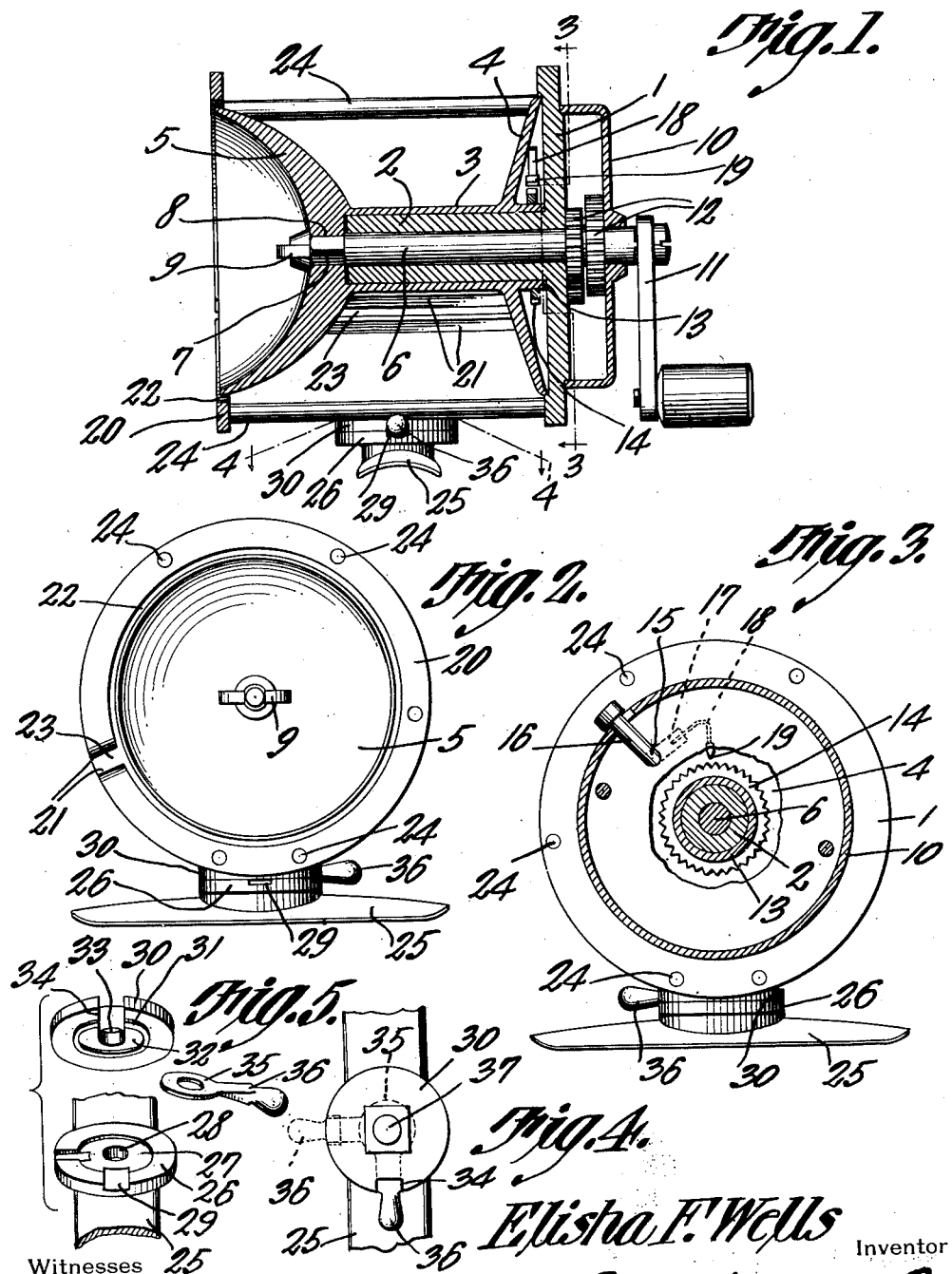

ELISHA FORD WELLS, OF MIAMI, FLORIDA.

CASTING-REEL.

1,114,084.  Specification of Letters Patent.  Patented Oct. 20, 1914.

Application filed September 22, 1913. Serial No. 791,169.

*To all whom it may concern:*

Be it known that I, ELISHA F. WELLS, a citizen of the United States, residing at Miami, in the county of Dade and State of Florida, have invented a new and useful Casting-Reel, of which the following is a specification.

The present invention appertains to fishing or casting reels, and aims to provide a novel and improved appliance of that character.

It is the object of the present invention to provide a fishing reel or winch which will permit the fishing line to be unwound over one flange or end of the reel proper, when the line is cast in the usual fashion, so as to avoid the spinning or rotation of the reel proper, which often results in a tangling of the fishing line.

Another object of the present invention is to provide a device of the nature indicated, embodying a novel means for journaling the reel proper so as to leave one flange or end thereof free, in combination with a unique guard or cage for the reel which will permit the line to be unwound over the free end or flange of the reel, and which will ordinarily guide the line when the reel is actuated to reel in or wind up the line.

A further object of the present invention is to provide a device of the nature specified embodying means for mounting the reel structure upon a fishing pole or rod, and in such a manner that the reel may be normally disposed at right angles to the pole or rod, to permit the line to be reeled in, and in order that the reel may be swung parallel with the fishing rod or pole, to permit the line to be drawn off of the reel when the line is cast, and without the necessity of the reel spinning or rotating.

It is also within the scope of the present invention to provide a unique and novel assemblage of parts to best carry out the results desired, and in order to enhance the utility of and to generally improve the construction of devices of the present character.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1 is a central longitudinal section of the improved fishing reel, parts being shown in full. Fig. 2 is an end view of the device. Fig. 3 is a sectional view taken on the line 3—3 of Fig. 1. Fig. 4 is a fragmental detail, taken on the section line 4—4 of Fig. 1. Fig. 5 is a view illustrating the several parts depicted in Fig. 4 in perspective and in separated positions.

In carrying out the present invention, there is provided a base plate or disk 1, which is provided with a central perpendicular sleeve 2. The hub 3 of the reel or spool proper is journaled upon the sleeve or axle 2, and embodies the inner flange 4 adjoining the plate 1, and the outer flange 5. The flange 5 is flared outwardly or convexed, as clearly seen in Fig. 1, to permit the line to be readily drawn thereover, as will hereinafter appear, when the fishing line is cast.

The basal portion of the inner flange 4 is attached to the hub 3 at a point slightly spaced from the inner end of the hub, and the flange 4 is conical or tapered, so that its rim or edge works snugly against the base plate 1, and provides a chamber or annular pocket between the said flange and the base plate for the purposes which will hereinafter appear.

A reel actuating shaft 6 is journaled through the sleeve or axle 2, and is provided with the non-circular portion 7 at its outer end extending through the contracted non-circular opening 8 formed at the outer end of the hub 3, a wing nut or other securing member 9 being engaged on the outer end of the shaft 6 to lock the reel upon the shaft, it being noted that the shoulder provided by the contracted opening 8 will seat against the shoulder formed by the non-circular portion 7.

As a means for actuating the reel, to wind up or reel in the fishing line, a case 10 is secured to the base plate 1 opposite the reel, and a suitable crank 11 is journaled through the central portion of the case 10 and is connected by a train of suitable gears 12 to the inner end of the shaft 6, it being understood that any suitable gearing may be employed to connect the crank and the shaft in order that the shaft may be rotated at the proper velocity when the crank is actuated by hand. The gearing 12 is confined within the case 10.

A "click" device is disposed within the annular chamber or pocket between the flange 4 of the reel and the base plate 1, and to this end, a toothed or serrated ring or annulus 14 is secured upon a boss or collar 13 formed by the inner projecting end of the hub 3, and a lever 15 is fulcrumed through the plate or disk 1, the outer arm 16 of the lever working through a slot provided in the rim of the case 10, and the inner arm 17 of the lever having an angular leaf spring 18 secured thereto, which leaf spring is provided with a suitable tip 19 for coöperation with the teeth or serrations of the member 14. The construction of the lever 15 is such, that when the arm 16 is swung in one direction, the tip 19 of the spring 18 will be retracted from the teeth or serrations of the member 14, and when the arm 16 is swung in the other direction, the tip 19 will be brought into coöperation with the said teeth or serrations.

The guard or cage for the reel embodies a bar, strap or strip or suitable metal bent to form a circular loop or split ring 20, the terminal portions of the bar being bent angularly from the ends of the ring and parallel to themselves to provide juxtaposed guide bars 21. The ring or loop 20 is disposed about the rim or edge of the flange 5, to provide an annular slot 22, and the end portions 21 of the bar provide a slot 23 communicating with or opening into the slot 22, the terminals of the bar being secured to the base plate or disk 1. The ring or loop 20 is connected to the plate or disk 1 by means of a plurality of circumferentially spaced rods or rungs 24.

The plate or disk 1 and the reel guard or cage, form the frame of the device, and this frame is provided with means for adjustably attaching it to a fishing pole or rod. The means for attaching the frame to the fishing pole or rod embodies the usual elongated and transversely curved plate 25 adapted to be attached to the fishing pole or rod in any well known manner. The plate 25, in the present instance, is formed with a central boss or seat 26, the boss 26 being provided with a concentric depression 27 and a central aperture or opening 28. The boss 26 is also provided with a pair of slots or notches 29 extending from the depression 27 to the periphery or circumference of the boss, and arranged at quadrature or right angles with respect to each other. A disk or plate 30, which forms a carrier or turret for the frame, is disposed snugly upon the boss 26, and is provided with a concentric rib 31 adapted to fit snugly within the walls of the depression 27, and forming a central depression 32. The carrier or turret 30 is provided with a central opening or aperture 33, and with a radial slot 34 extending to the circumference or periphery. Within the depressions 27 and 32 is snugly disposed a washer 35, which is equipped with a tail or radial extension 36 fitting within the slot 34 and spring pressed to snap into the slots or notches 29 of the boss 26. The boss 26, turret 30, and washer 35, are assembled by means of a bolt or pivot member 37 passing through the apertures 28 and 33 and through the aperture of the washer 35.

The turret or carrier 30 has its outer face soldered or otherwise secured to a pair of the cross rods or rungs 24, in order that the reel frame may be conveniently carried by the turret 30. The slots or notches 29 are so disposed, that when the member or catch 36 engages one of the slots 29, the reel will stand at right angles to the plate 25, and when the catch 36 is engaged to the other slot 29, the reel will be disposed parallel to the plate 25.

In practice, the plate 25 is attached to the fishing pole or rod in the usual fashion, so as to stand longitudinally of the pole or rod, the plate 25 being so disposed as to properly position the slots 29 to carry out the results hereinafter described. The fishing line, not shown, is attached to the reel in any desirable manner, and passed between the members 21 or through the slot 23, when the reel is at its normal position with respect to the pole. Thus, when the reel is disposed at right angles to the pole, the fishing line may be readily wound up or reeled in by turning the crank 11, the reel proper being rotated upon the axle or sleeve 2 by means of the shaft 6 which is journaled through the axle or sleeve 2 and which is operatively connected at its outer end to the outer end of the reel.

When the fishing line is to be cast, the catch 36 is swung out of engagement with the respective slot 29, and the reel frame is swung parallel to the fishing pole, in order that the catch 36 may engage the other slot 29 to hold the reel parallel to the pole, which will cause the free end of the reel to project toward the tip of the pole. When the reel is so positioned, the fishing line may be drawn from the slot 23 into the annular slot 22 and, as a result, when the line is cast, the same may readily unwind from the reel, without the necessity of the reel spinning or revolving. This will be clearly apparent, inasmuch as the fishing line, as it is drawn off the reel, may work around the flange 5 of the reel within the annular slot 22, the flange 5 being flared or convexed to permit the line to be readily slipped or drawn thereover. After the line has been cast, the reel and its frame may be swung to normal position, by releasing the catch 36 and by properly swinging the reel frame, as will be apparent. The fishing line will then be readily drawn into the slot 23, in order that the line may be reeled in when necessary or desired.

After the line has been cast, the "click" device may be brought into play, in order that a pull or jerk upon the line will rotate the reel in the further unwinding of the fishing line, and thereby causing a series of clicks, which will call the fisherman's attention to a possible catch, in order that the line may be let out, or reeled in, as desired.

A cardinal or salient feature of the present invention resides in the provision of the reel frame, and the peculiar mounting of the reel therein, in connection with the means for mounting the frame upon the pole, in order to swing the device to reeling or unreeling positions, to carry out the results desired. The advantages and capabilities of the present device will be obvious without further comment, it being observed that the objects aimed at have been carried out in a satisfactory manner.

Having thus described the invention, what is claimed as new is:—

1. In a device of the character described, a plate, a reel rotatably carried thereby, and a guard surrounding the reel and attached to the said plate, the guard including a split ring loosely surrounding the free flange of the reel to form an annular slot, and parallel juxtaposed bars extending from the end of the ring and attached to the plate to provide a slot opening into the aforesaid slot.

2. In a device of the character described, a reel frame having one end open and a reel rotatably carried by the frame, a member attachable to a fishing pole or rod and having a seat and radial notches, a turret pivoted upon the said seat and attached to the said frame, the turret having a radial slot, and a spring catch disposed between the seat and turret and projecting in the said slot to snap into engagement with the said notches for holding the said frame at various angular positions with respect to the said member.

In testimony that I claim the foregoing as my own, I have hereto affixed my signature in the presence of two witnesses.

ELISHA FORD WELLS.

Witnesses:
SELINA WILLSON,
I. E. SIMPSON.